United States Patent
Gonzalez et al.

(10) Patent No.: US 9,846,548 B2
(45) Date of Patent: *Dec. 19, 2017

(54) TAPE LIBRARY EMULATION WITH AUTOMATIC CONFIGURATION AND DATA RETENTION

(71) Applicant: OVERLAND STORAGE, INC., San Diego, CA (US)

(72) Inventors: Victoria Gonzalez, Escondido, CA (US); Sergio Encarnacao, San Diego, CA (US)

(73) Assignee: Overland Storage, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/359,458

(22) Filed: Nov. 22, 2016

(65) Prior Publication Data

US 2017/0262200 A1     Sep. 14, 2017

Related U.S. Application Data

(63) Continuation of application No. 14/296,367, filed on Jun. 4, 2014, now abandoned, which is a continuation of application No. 13/613,373, filed on Sep. 13, 2012, now Pat. No. 8,751,759, which is a continuation of application No. 11/356,726, filed on Feb. 17, 2006, now Pat. No. 8,291,160.

(Continued)

(51) Int. Cl.
*G06F 3/06*     (2006.01)
*G06F 11/14*    (2006.01)

(52) U.S. Cl.
CPC ............ *G06F 3/0619* (2013.01); *G06F 3/065* (2013.01); *G06F 3/0607* (2013.01); *G06F 3/067* (2013.01); *G06F 3/0613* (2013.01); *G06F 3/0646* (2013.01); *G06F 3/0664* (2013.01); *G06F 3/0665* (2013.01); *G06F 3/0686* (2013.01); *G06F 3/0689* (2013.01); *G06F 11/1456* (2013.01); *G06F 11/1461* (2013.01)

(58) Field of Classification Search
CPC .... G06F 3/0682; G06F 3/0686; G06F 3/0607; G06F 3/0664
USPC .................................................. 711/114, 161
See application file for complete search history.

(56) References Cited

U.S. PATENT DOCUMENTS 4,467,421 A     8/1984   White et al.
6,070,224 A     5/2000   LeCrone et al.
(Continued)

FOREIGN PATENT DOCUMENTS

WO     WO 00/04454 A     1/2000

OTHER PUBLICATIONS

International Search Report and Written Opinion dated Apr. 12, 2007 in Application No. PCT/US2006/005713, filed Feb. 17, 2006.

*Primary Examiner* — Than Nguyen
(74) *Attorney, Agent, or Firm* — Knobbe, Martens, Olson & Bear, LLP

(57) ABSTRACT

Disk based emulation of tape libraries is provided with features that allow easier management and administration of a backup system and also allow increased flexibility to both archive data on tape at a remote location and also have fast restore access to archived data files. Features include automatic emulation of physical libraries, and the retention and write protection of virtual tapes that correspond to exported physical tapes.

12 Claims, 14 Drawing Sheets

Related U.S. Application Data

(60) Provisional application No. 60/654,714, filed on Feb. 17, 2005.

(56) References Cited

U.S. PATENT DOCUMENTS

| | | | |
|---|---|---|---|
| 6,173,359 B1 | 1/2001 | Carlson et al. | |
| 6,260,110 B1 | 7/2001 | LeCrone et al. | |
| 6,324,497 B1 | 11/2001 | Yates et al. | |
| 6,351,792 B1 | 2/2002 | Milillo | |
| 6,425,050 B1 | 7/2002 | Beardsley et al. | |
| 6,477,628 B1 | 11/2002 | Bish et al. | |
| 6,557,073 B1 | 4/2003 | Fujiwara et al. | |
| 6,834,324 B1 | 12/2004 | Wood | |
| 6,957,291 B2 * | 10/2005 | Moon | G06F 3/0607 361/679.37 |
| 7,162,604 B1 | 1/2007 | Nourmohamadian et al. | |
| 7,200,546 B1 | 4/2007 | Nourmohamadian et al. | |
| 7,349,930 B2 | 3/2008 | Bolt | |
| 7,444,465 B2 * | 10/2008 | Matze | G06F 3/0605 711/111 |
| 7,761,284 B2 * | 7/2010 | Matze | G06F 3/0605 703/23 |
| 8,122,191 B2 | 2/2012 | Desimone et al. | |
| 8,291,160 B2 * | 10/2012 | Gonzalez | G06F 3/0607 711/114 |
| 8,571,759 B2 * | 10/2013 | Oblizajek | B62D 5/0472 180/446 |
| 2003/0070056 A1 | 4/2003 | Greco | |
| 2004/0030668 A1 | 2/2004 | Pawlowski et al. | |
| 2004/0034811 A1 | 2/2004 | Trimmer et al. | |
| 2004/0044842 A1 | 3/2004 | Trimmer et al. | |
| 2004/0111251 A1 | 6/2004 | Trimmer et al. | |
| 2004/0153614 A1 | 8/2004 | Bitner et al. | |
| 2005/0071392 A1 | 3/2005 | Sandorfi et al. | |
| 2005/0108486 A1 | 5/2005 | Sandorfi | |
| 2005/0193235 A1 | 9/2005 | Sandorfi et al. | |
| 2006/0074520 A1 | 4/2006 | Trimmer et al. | |
| 2006/0123189 A1 | 6/2006 | Bitner et al. | |
| 2006/0149889 A1 | 7/2006 | Sikha | |

* cited by examiner

TAPE LIBRARY EMULATION WITH AUTOMATIC CONFIGURATION AND DATA RETENTION

CROSS-REFERENCE TO RELATED APPLICATIONS

This application is a continuation of and claims a priority benefit from U.S. application Ser. No. 14/296,367 filed on Jun. 4, 2014 and entitled Tape Library Emulation with Automatic Configuration and Data Retention, which is a continuation of and claims a priority benefit from U.S. application Ser. No. 13/613,373 filed on Sep. 13, 2012 and entitled Tape Library Emulation with Automatic Configuration and Data Retention, which is a continuation of and claims a priority benefit from U.S. application Ser. No. 11/356,726, filed on Feb. 17, 2006 and entitled Tape Library Emulation with Automatic Configuration and Data Retention, which claims priority to under 35 U.S.C. Section 119(e) to Provisional Application 60/654,714, filed on Feb. 17, 2005. The disclosures of these applications are hereby incorporated by reference in their entireties. Furthermore, any and all priority claims identified in the Application Data Sheet, or any correction thereto, are hereby incorporated by reference under 37 C.F.R. §1.57.

BACKGROUND OF THE INVENTION

Field of the Invention

This invention relates to systems and methods for storing electronic data and has applicability to enterprise data backup systems.

Description of the Related Art

Improving backup and restore performance is a continuing desire of enterprise data managers. In a typical computing environment, magnetic disk drives are used as the primary storage mechanism for active data, whereas magnetic tapes are used for data backup and archive. The magnetic disks provide rapid and reliable access to data, but they are perceived as being more expensive. In addition, since they are non-removable, they are at risk of physical disasters. Magnetic tape storage is perceived as being less expensive and, because tape cartridges are removable, they can be moved to offsite locations to protect against physical disasters. Therefore, most backup software in use has been optimized for use with magnetic tape technology.

Reading and writing data on a tape requires that the reel be unwound until the desired location is found. Once in the appropriate location, the read or write operation can begin. Because of the mechanical nature of this access, read and write operations are slow and often fail. In many situations, it would be beneficial to provide the random access speed and the reliability of a magnetic disk drive to backup systems while still allowing for the possibility of offsite storage. As a result, a new category of magnetic disk systems is becoming popular called virtual tape technology.

Virtual tape systems are magnetic disk systems that transparently emulate a tape drive and/or a tape library. They provide the same physical connections to a host, such as SCSI, Fibre Channel or Ethernet. This allows them to connect in the same way as the tape systems they are replacing or augmenting. They also provide the same logical response to tape drive and robot commands, which allows the same backup software to remain in use. The emulator is also able to send the host computer the expected tape-drive interrupt signals such as beginning-of-tape, end-of-tape, and inter-record-gap. In this case, such a system can plug right in to an existing tape based storage system without a need for the user to change the storage network or software environment.

Although such systems have been successful in the marketplace, the currently available devices still do not fully take advantage of the properties of disk storage in a way that provides maximum flexibility and usefulness.

SUMMARY OF THE INVENTION

In one embodiment, the invention comprises a method of emulating a tape library data storage system using one or more hard disk drives. The method comprises querying one or more physical tape libraries in a data storage system to acquire a configuration of the one or more physical tape libraries in the data storage system. Data storage space is allocated on the one or more hard disk drives to virtual devices of one or more virtual tape libraries, wherein the one or more virtual tape libraries comprise virtual devices emulating physical devices in the acquired configuration of the one or more physical tape libraries in the tape storage system. Data storage space is also allocated on the one or more hard disk drives to at least one additional virtual device associated with the one or more virtual tape libraries, wherein the extra virtual device has no corresponding physical device in the data storage system.

In another embodiment, a method of emulating data storage on a magnetic tape media using one or more hard disk drives comprises allocating data storage space of the one or more hard disk drives to one or more virtual tape libraries, wherein the one or more virtual tape libraries comprise one or more virtual devices emulating states of one or more physical devices of the one or more physical tape libraries in a tape storage system, and storing data in the storage space allocated to the one or more virtual tape libraries according to a first user defined periodic schedule. This method further includes replicating the data stored on the one or more virtual tape libraries onto the one or more physical tape libraries according to a second user defined periodic schedule.

In another embodiment, a method of handling data storage on a hard disk storage system implemented to emulate one or more attached tape libraries comprises requesting export of at least one physical tape from a physical tape library and write-protecting the data on the hard disk storage system that is associated with the virtual tape corresponding to the physical tape to be exported.

In another embodiment, a method of emulating a tape library data storage system using one or more hard disk drives comprises allocating data storage space on the one or more hard disk drives to virtual devices of one or more virtual tape libraries, wherein the one or more virtual tape libraries comprise virtual devices emulating physical devices of one or more physical tape libraries in the tape storage system. The method further includes allocating data storage space on the one or more hard disk drives to at least one additional virtual tape library that has no corresponding physical tape library in the data storage system.

In another embodiment, the invention comprises a storage system comprising at least one disk based storage appliance and at least one tape library. The disk based storage appliance is configured to respond to commands generated by backup software as at least one emulated tape library. The disk based storage appliance stores data files in an emulated tape library accessible to the backup software that are also stored on tapes that have been previously removed from the tape library. Thus, tape archive and disk based read access to a set of data files is simultaneously provided.

DETAILED DESCRIPTION OF THE PREFERRED EMBODIMENT

Preferred embodiments of the present invention will now be described with reference to the accompanying Figures, wherein like numerals refer to like elements throughout. The terminology used in the description presented herein is intended to be interpreted in its broadest reasonable manner, even though it is being utilized in conjunction with a detailed description of certain specific preferred embodiments of the present invention. This is further emphasized below with respect to some particular terms used herein. Any terminology intended to be interpreted by the reader in any restricted manner will be overtly and specifically defined as such in this specification.

Figure 1:
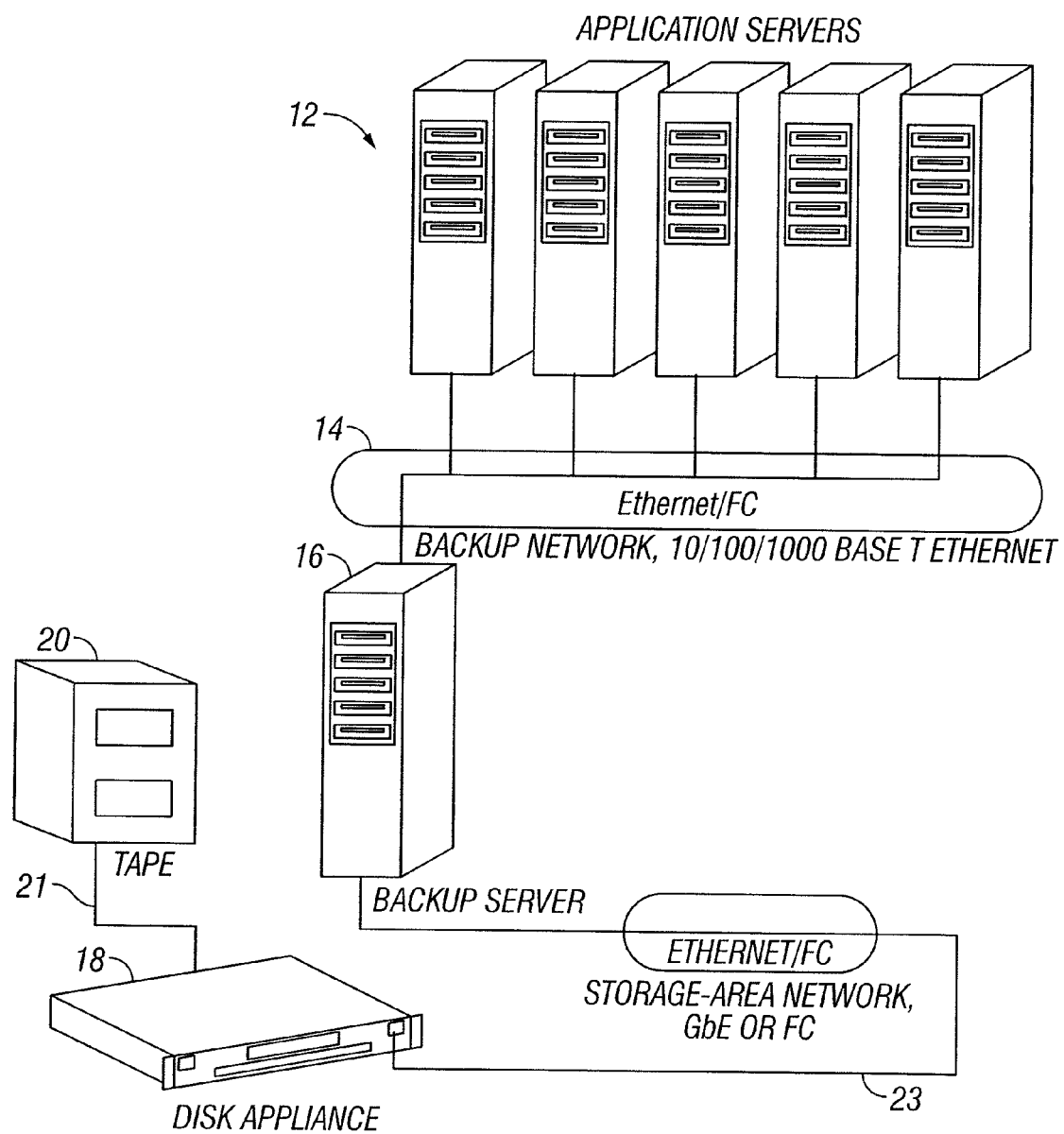
FIG. 1 is a schematic of one embodiment of a data backup system in which the invention may advantageously be used.

FIG. 1 illustrates one example of a system including a hard disk based appliance with tape emulation features that can be used in a data protection environment. In this system, application servers 12 are connected to each other and to a backup server 16 over a network 14. In one embodiment, the backup server 16 communicates directly with the disk appliance 18 and has no direct communication to the tape system 20. In this embodiment; the tape system 20 is under the control of the disk appliance 18 via a SCSI, iSCSI, Ethernet, Fibre Channel, or other protocol communication link 21. It will be appreciated that multiple tape systems may be connected to communication link 21.

Backups from application servers 12 are received by appliance 18 (via the backup server 16) and are written to disk based (preferably RAID) storage of appliance 18. The disk appliance 18 may include an internal disk drive array, and may alternatively or additionally connect to an external disk drive array through a storage adapter which may, for example, be configured as a Fibre Channel or SCSI interface.

Appliance 18 may then automate the process of transferring the data stored on disk media to physical tape media in tape system 20 for archival purposes. As explained further below, the transfer of the disk stored data to physical tape media may be done without user intervention on a periodic basis. Furthermore, the appliance 18 may periodically monitor the tape system 20 for changes such as tape import or export (a tape being installed or removed from one of the physical tape libraries) and generate appropriate actions to ensure that the RAID storage virtual media emulates the physical media on tape system 20.

It will be appreciated that the hardware components, functionality, and software present in the backup server 16, disk appliance 18, and tape drive/library can be combined and/or separated in various ways. For example, the disks of appliance 18 can be located in a separate device. As another example, the tape drive/library 20 hardware and functions can be integral with the disk appliance 18 rather than provided as a separate unit. As described above, the appliance 18 can be configured to interact with the backup server 16 in exactly the same manner and format of communication as the tape drive/library 20. In this way, software on the backup server 16 that is configured to communicate and store data using tape commands and tape data formats can utilize the disk based appliance 18 without modification. Speed is still improved in many cases such as restore operations, however, because tape commands such as moving to a desired block can be accomplished on disk with the virtual tape much faster than a physical tape cartridge in a physical tape drive.

Figure 2:
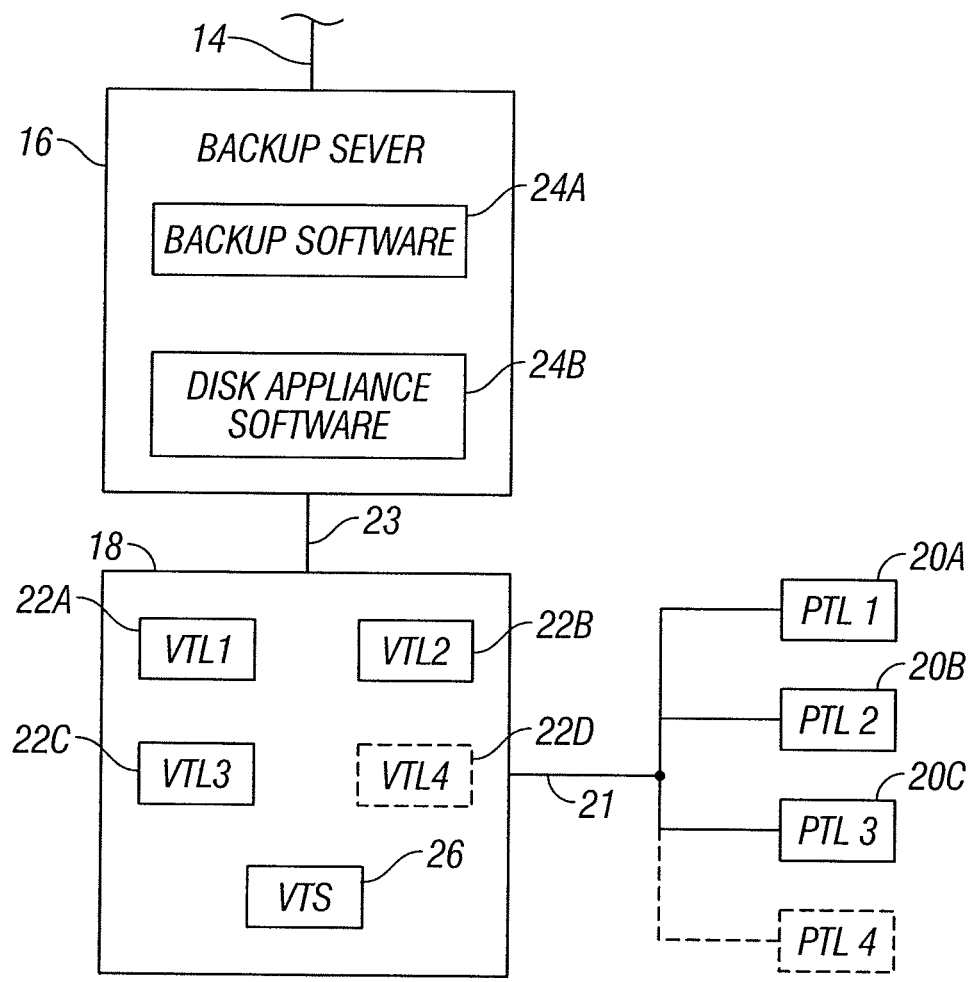
FIG. 2 is a functional block diagram of certain components of an embodiment of the backup system of FIG. 1.

FIG. 2 is a functional block diagram of certain components of an embodiment of the backup system of FIG. 1. In the example of FIG. 2, the disk appliance 18 has a first communication link 23 (of any protocol) connected to a backup server 16. The backup server will typically contain a backup software program 24A that controls data transfer from the application servers 12 (FIG. 1) to the appliance 18. The disk appliance 18 will also typically host another software program 24B that is used to configure the appliance 18, and define how the appliance 18 responds to commands and data received over the link 23 from the server backup software 24A. Software 24B can wholly or partly reside in memory in the appliance 18 and/or the backup server 16. In one embodiment, the disk appliance software is accessed via a browser program on backup server 16 or any other computer on the network.

The appliance 18 is also coupled to another communication link 21 that is connected to three physical tape libraries (PTL) 20A, 20B and 20C. More or fewer tape libraries may be provided, it will be appreciated that three is merely an example. In some embodiments, a single physical tape library can be partitioned to behave as if it were multiple separate tape libraries, as described in U.S. Pat. No. 6,328,766, the entire disclosure of which is hereby incorporated by reference. It will be appreciated that any or all communication links connecting the devices of FIG. 1 could be over the same network link.

The disk appliance 18 in the example of FIG. 2 is configured to include three virtual tape libraries (VTL) 22A, 22B and 22C. The VTL1 (22A) contains virtual devices emulating the physical devices of PTL1 (20A), while virtual devices in VTL2 (22B) and VTL3 (22C) emulate the physical devices of PTL2 (20B) and PTL3 (20C), respectively. The "emulation" of tape libraries in disk appliances is known in the art, and those of skill in the art understand and can create hardware and software components for an appliance 18 that can emulate tape libraries.

Generally, tape library emulation is understood to mean that the appliance 18 responds to commands and data transfers from the backup server with responses and data that the backup server expects from a tape library being emulated, even though no physical tape library is in direct communication with the backup server 16. In the discussion that follows, manipulation of both physical objects and virtual objects is described. When such terminology is applied to virtual objects, such as "moving" or "creating" a virtual tape, or "allocating" some portion of disk appliance 18 to a virtual object, these terms are intended as generally used in the art to mean that the disk appliance 18 is configured or re-configured to respond to commands from the backup server with the same responses that would be produced by a physical device having characteristics corresponding to the virtual device in its latest virtual configuration.

Although emulation of tape libraries in disk based appliances is known, their usefulness has been limited due to complexities in the management of the combined disk and tape storage environment. In accordance with the inventions described herein, data storage systems with improved properties, data access, and simplified management are provided.

It is often desirable for the emulated tape libraries 22 to be configured identically to the physical tape libraries 20. To accomplish this in an efficient and easily administered manner, the appliance 18 may be configured to use standard query commands to detect the configuration of the physical tape libraries such as the number and type of tape drives, the number of storage slots, etc. Upon receiving this information, the appliance 18 can be configured automatically to emulate a tape library identical to a given physical library coupled to the appliance 18. In addition, if a new PTL, PTL4 (20D) for example, is added to the tape storage system, the disk appliance can query the PTL4 (20D) and then emulate the discovered physical devices with virtual devices in VTL4 (22D).

The disk appliance software 24B comprises user interface software to control the configuration of features of disk appliance 18. Features controllable by the disk appliance software 24B described further below include, for example, control over replication of the data stored on the VTL's by the backup software 24A to the PTL's for synchronization, data retention time limits upon removal of tapes from the PTL and virtual device configuration management software.

During operation, the backup software is configured to perform backup and restore operations to PTL1, PTL2, and PTL3 as defined and managed by the system administrator as if the appliance 18 was not present. This is typically performed on a periodic schedule fixed by a system administrator via backup software 24A. The commands and interactions are received by the appliance 18, and the appliance 18 interacts with the backup server 16 as if it were a collection of PTL's. As described above, the data stored on the appliance 18 by the backup software is periodically or on command (via the appliance software 24B) transferred to the physical tapes in the physical tape libraries 20 so that the data intended for storage on tapes in the PTL's is physically present on those tapes within reasonable and desired time frames defined by a system administrator. A second periodic schedule different from the periodic backup schedule can be used for synchronizing data in the virtual libraries with data in the physical libraries.

It is one aspect of some embodiments of the invention that the disk appliance can implement an additional emulated tape library, referred to herein as the "virtual shelf" (VTS) 26. The shelf 26 can be used to allow access to data on tape cartridges that have been exported from the PTL's. This feature is described further below.

Figure 3:
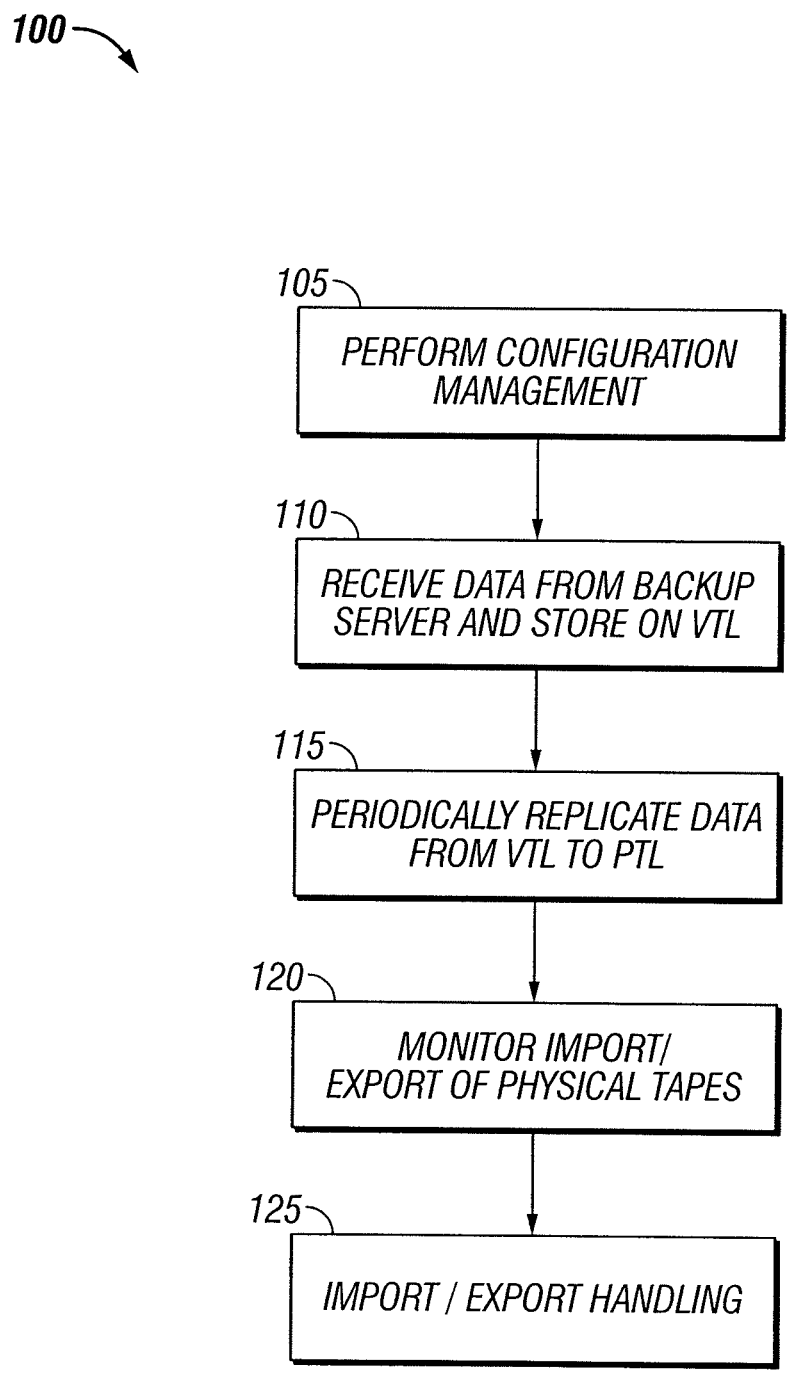
FIG. 3 is a flow chart of the operation of one embodiment of the system of FIG. 2.
Figure 4:
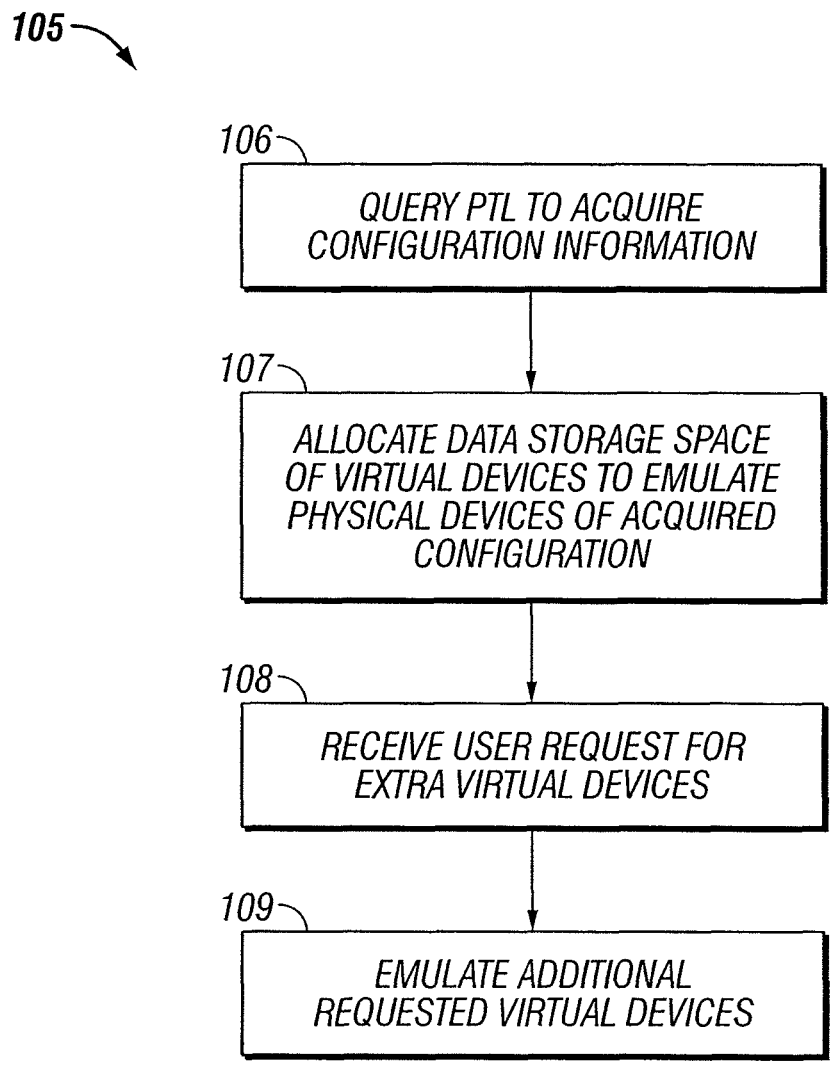
FIG. 4 is a flow chart of a method of configuring a virtual tape library in one embodiment of the invention.
Figure 5:
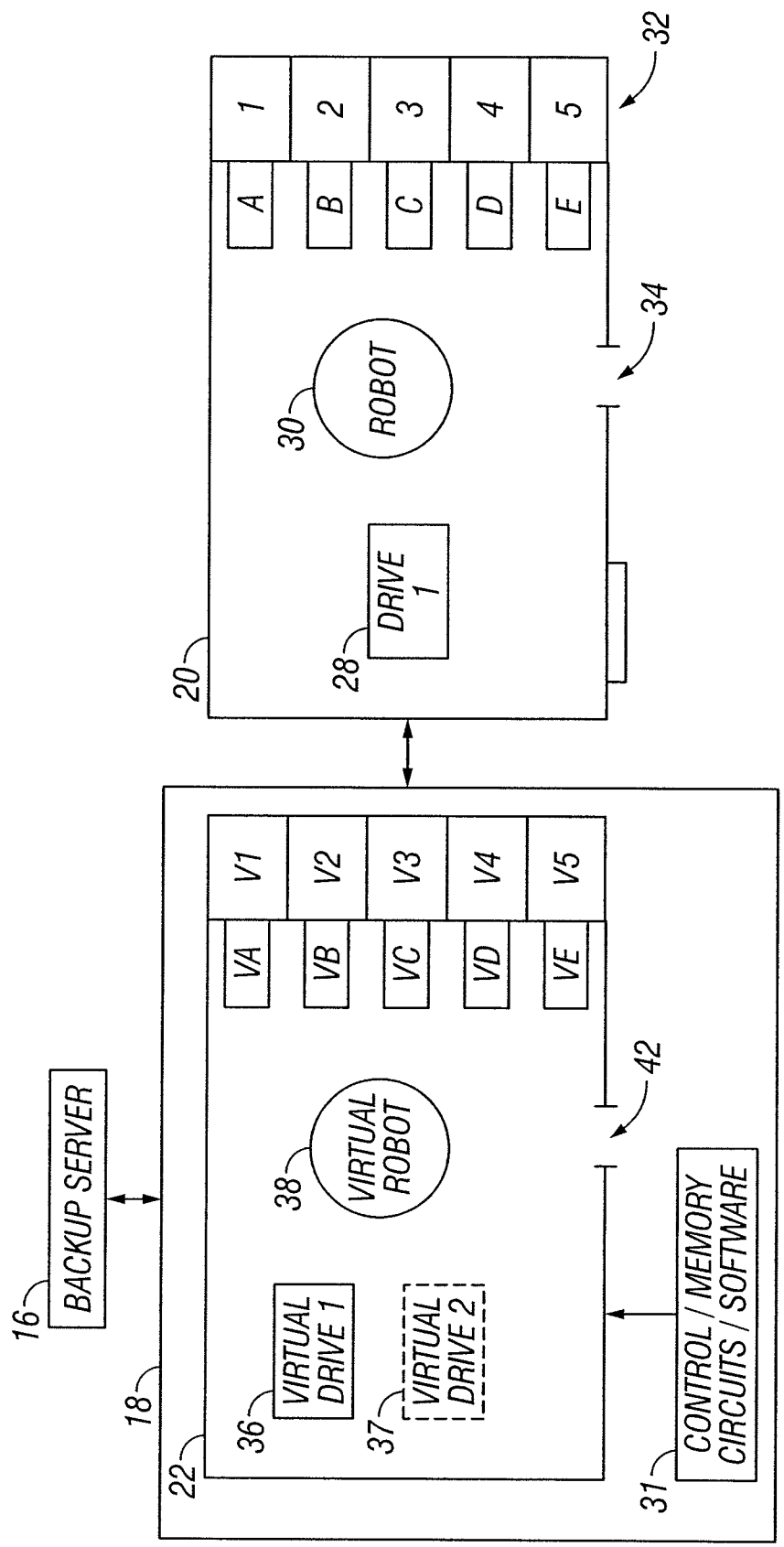
FIG. 5 is a functional block diagram of a virtual and physical library configuration in one embodiment of the invention.

FIG. 3 illustrates a process that may be performed by the system of FIG. 2. Referring now to FIG. 3, process 100 starts at step 105 by performing configuration management of the various virtual devices in the disk appliance 18. FIGS. 4 and 5 discussed below provide additional detail concerning this process that can be performed in some invention embodiments. Disk appliance 18 can query PTL's connected to it via various network connections to acquire configuration information at step 106. Configuration information acquired at step 106 can include newly added components such as the PTL4 (20D) shown in FIG. 2. Configuration information changes can also include modification of existing hardware and deletion of existing hardware in the attached PTL's 20.

Process 100 continues at step 110 where data transferred under control of backup software on the backup server 16 is received by the appliance 18. As discussed above, the backup server 16 communicates data to be backed up on PTL 20 directly to disk appliance 18. Disk appliance 18 stores the received data to the various virtual devices that correspond to the physical devices requested by the backup server 16. Process 100 continues at step 115 where data stored on VTL 22 is replicated on the PTL 20 so as to synchronize the data between the VTL 22 and the PTL 20. This replication may be periodic (e.g., every day, every 12 hours, etc.). The replication policies may be user settable as discussed above.

At step 120, the process 100 continues with the monitoring of the PTL(s) 20 for detection of imported or exported physical tapes. The import and/or export handling acts are carried out at step 125. Several example cases of tape import/export and the handling of these cases are discussed below. It will be appreciated that data backups of step 110, replication to the physical libraries of step 115, and the import/export handling of tapes are performed periodically and/or on command as required in any order on any desired schedule in an ongoing manner during operation of the system.

Referring now to FIGS. 4 and 5, virtual library configuration management in some embodiments of the invention is illustrated. In the example of FIG. 5, the PTL 20 contains one physical tape drive 28, a robotic media changer 30, five tape storage slots 32 (labeled 1 through 5) containing five tape cartridges labeled A-E, and a tape export slot 34. Accordingly, during step 106 of FIG. 4, the appliance 18 queries the PTL 20 do detect the PTL configuration. After gathering the information, the corresponding VTL 22 is created in the appliance at step 107, emulating the hardware of PTL 20 to contain one virtual tape drive 36, a virtual media changer robot 38, five virtual tape slots 40 (labeled V1 through V5) containing five virtual tape cartridges labeled VA through VE, and a tape export slot 42. The disk appliance 18 may implement the virtual media changer 38 as a standard SCSI media changer device, as defined in the T10 SMC-2 document. Each virtual tape drive 36 inside the VTL 22 may comprise an emulation of a standard SCSI sequential device, as defined in the T10 SSC-2 document. The process of "creating" or "implementing" the virtual library typically comprises the creation of data files stored in the control/memory circuits 31 of the appliance 18 that define the appliance response to commands and communications received from the backup server 16. The data format, organization, and disk space allocation to implement virtual tape cartridges in the disk appliance 18 may be performed as described in U.S. patent application Ser. Nos. 11/215,740 and 10/943,779, the entire disclosures of which are hereby incorporated by reference in their entireties.

In addition to emulating physical devices of attached PTL's 20, disk appliance 18 can (at step 108) receive requests from users, e.g., users of the backup server 16 utilizing the disk appliance software 24B shown in FIG. 2, to add additional virtual devices that do not have corresponding physical devices in attached PTL's. For example, a user may request to add a second virtual drive 37, when the attached PTL 20 has only one physical drive 28. The disk appliance will then emulate the requested additional virtual devices at step 109.

As discussed above in relation to the disk appliance software 24B as shown in FIG. 2, the configuration management task 105 may also modify data retention policies, replication time periods and other user settable options.

Figure 6:
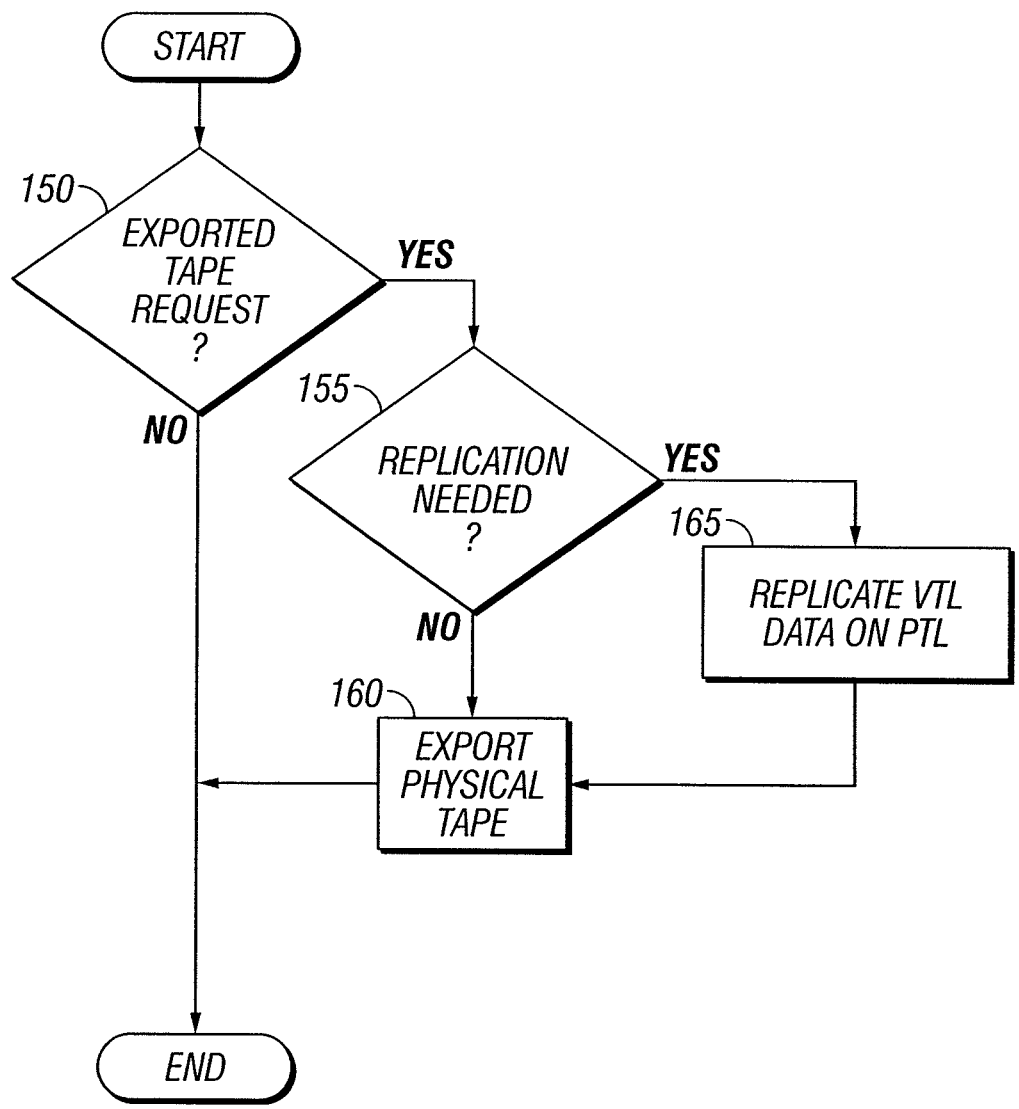
FIG. 6 is a flow chart illustrating a method of physical and virtual library synchronization.
Figure 7:
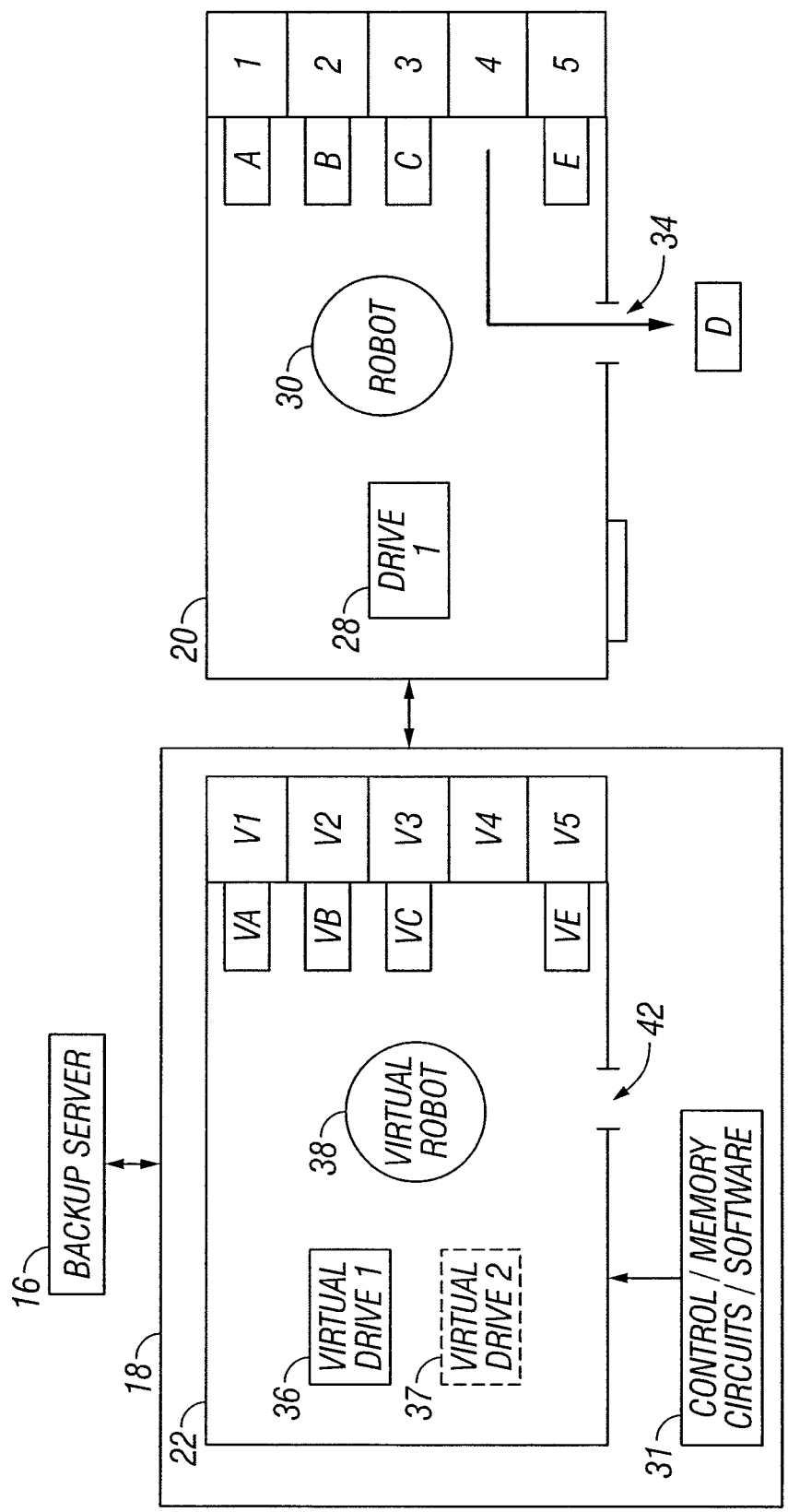
FIG. 7 is a functional block diagram of a virtual and physical library configuration in another embodiment of the invention.

FIGS. 6 and 7 illustrate certain steps in a process of handling export of a physical tape from the PTL 20. For example, the backup software 24A may send a command to the appliance 18 to export from the tape library the tape that is in slot 4, designated D in FIG. 7. In other cases, a user with access to the PTL 20 may use a keypad or separate control input to the PTL 20 to command export of tape D. In the first case, the appliance 18 receives the command from the backup server. In the second case, the appliance 18 receives a message from the PTL 20 that the selected tape is being exported. Thus, tape export requests to the PTL are monitored by the appliance 18 at step 150. The process then continues to decision block 155, where a check is made as to whether any replication is needed to synchronize the physical tape to be exported with the corresponding virtual tape. If the tapes are fully synchronized then permission to export the physical tape is issued at step 160. If the physical tape and virtual tape do not match, then replication is performed at step 165. After the data on the virtual tape is replicated on the physical tape, then the permission to export the physical tape is issued at step 160. As shown in FIG. 7, when the tape is exported form the PTL, the corresponding virtual tape is removed from the VTL 22, and the virtual slot appears empty.

Figure 8:
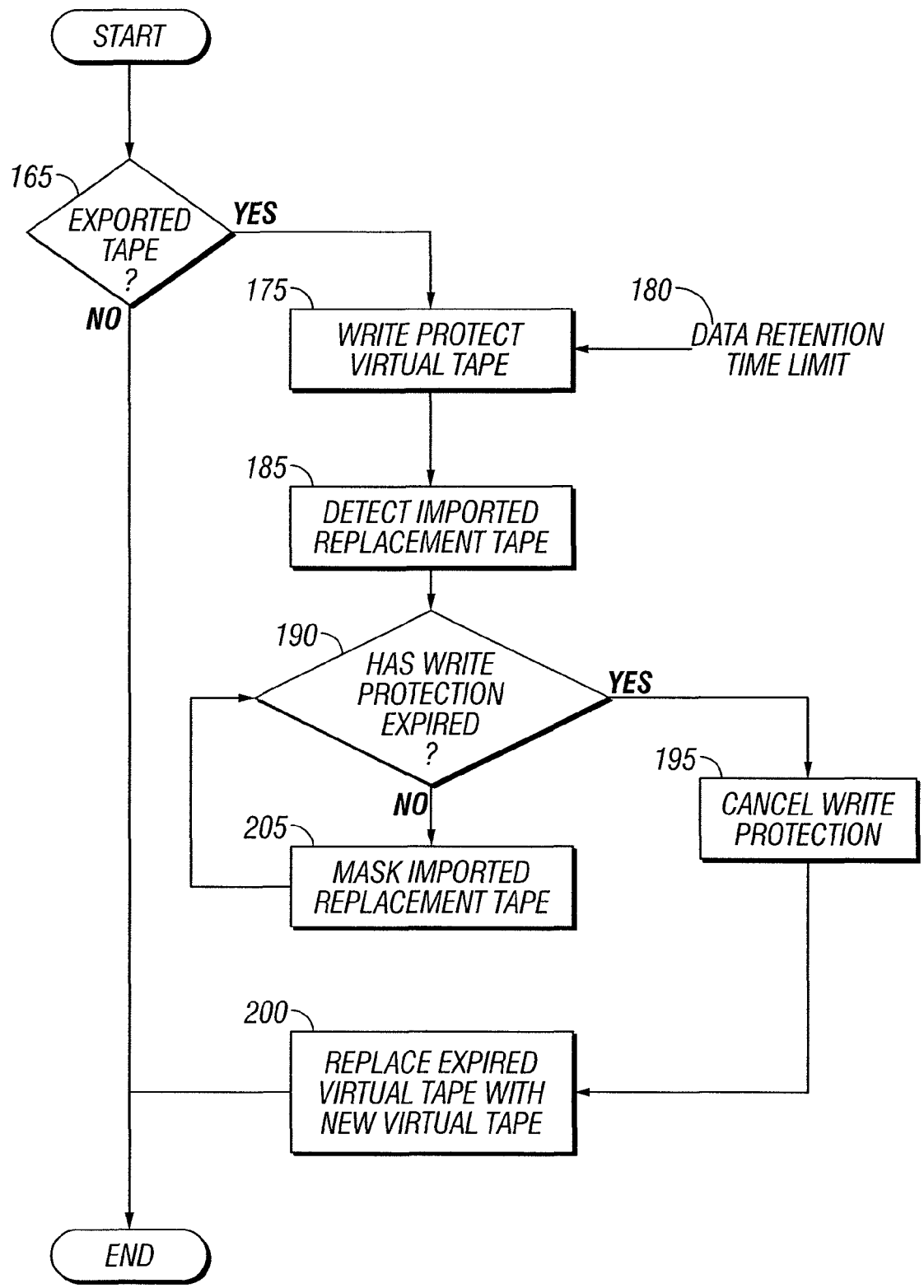
FIG. 8 is a flow chart of a method of disk storage data retention in one embodiment of the invention.
Figure 9A:
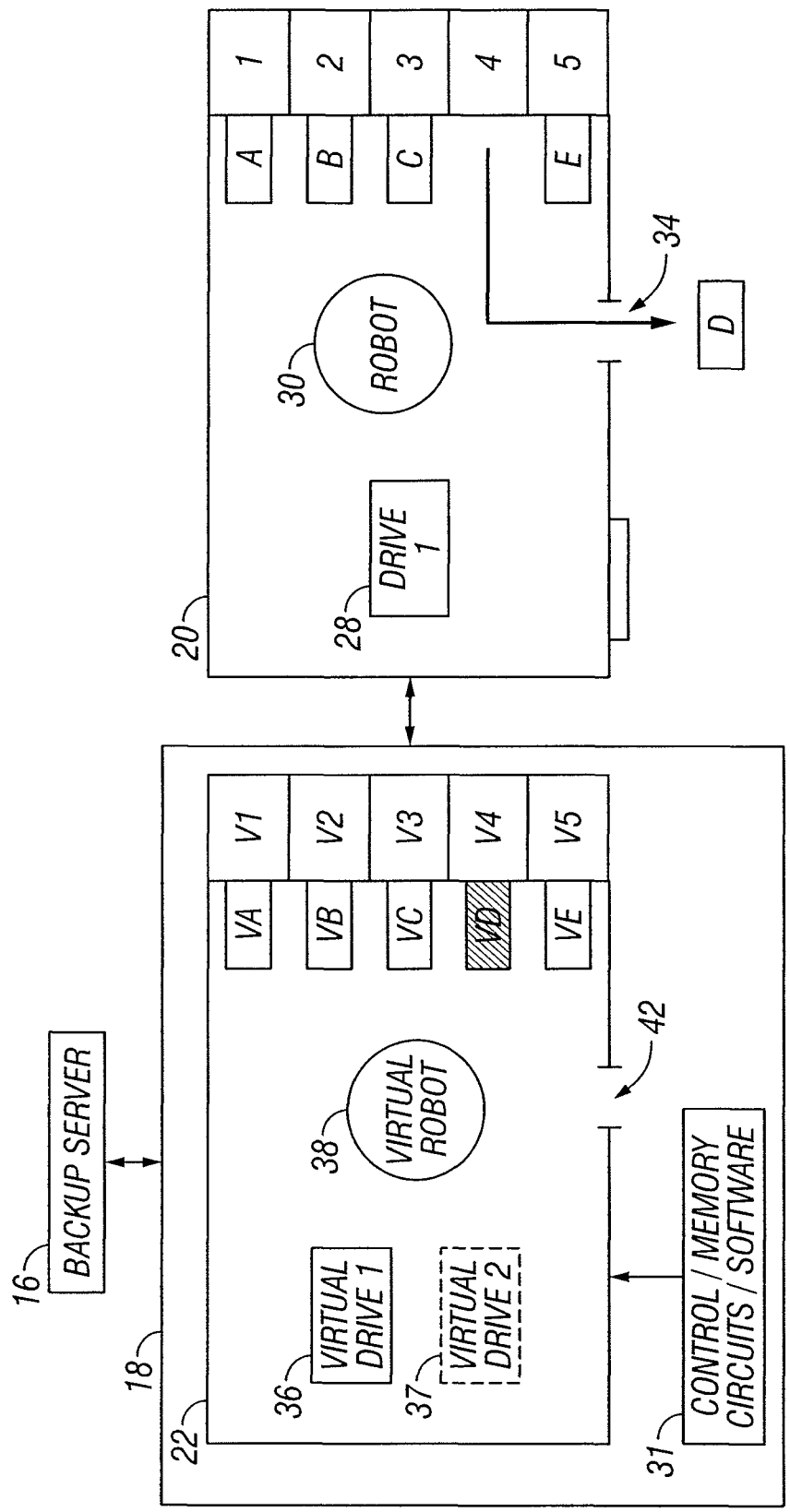
FIGS. 9A-9C are functional block diagrams of virtual and physical library configurations in another embodiment of the invention.

FIG. 8 shows a flow diagram illustrating certain steps in another process of handling export of a physical tape where a data retention policy is implemented. At decision block 165, it is determined whether a tape is being exported. Next, instead of having the virtual tape removed from the virtual library 22 upon physical tape export as shown in FIG. 7, at step 175 the virtual tape cartridge remains in the virtual library but is indicated as write protected, illustrated in FIG. 9A as shaded. In this way, the content of the virtual tape cartridge D will remain synchronized with exported physical tape cartridge D, but the backup server will have read access to the files stored there, even though the physical tape is no longer present, perhaps having been moved to an offsite remote location for disaster recovery safekeeping. This feature of appliance 18 allows the benefits of both on-site read access to archived files for fast restores, and simultaneous offsite data storage of the same files in an easily managed way. In advantageous embodiments, a data retention time limit may be selected by the system administrator via the disk appliance software 24B shown in FIG. 2.

Figure 9B:
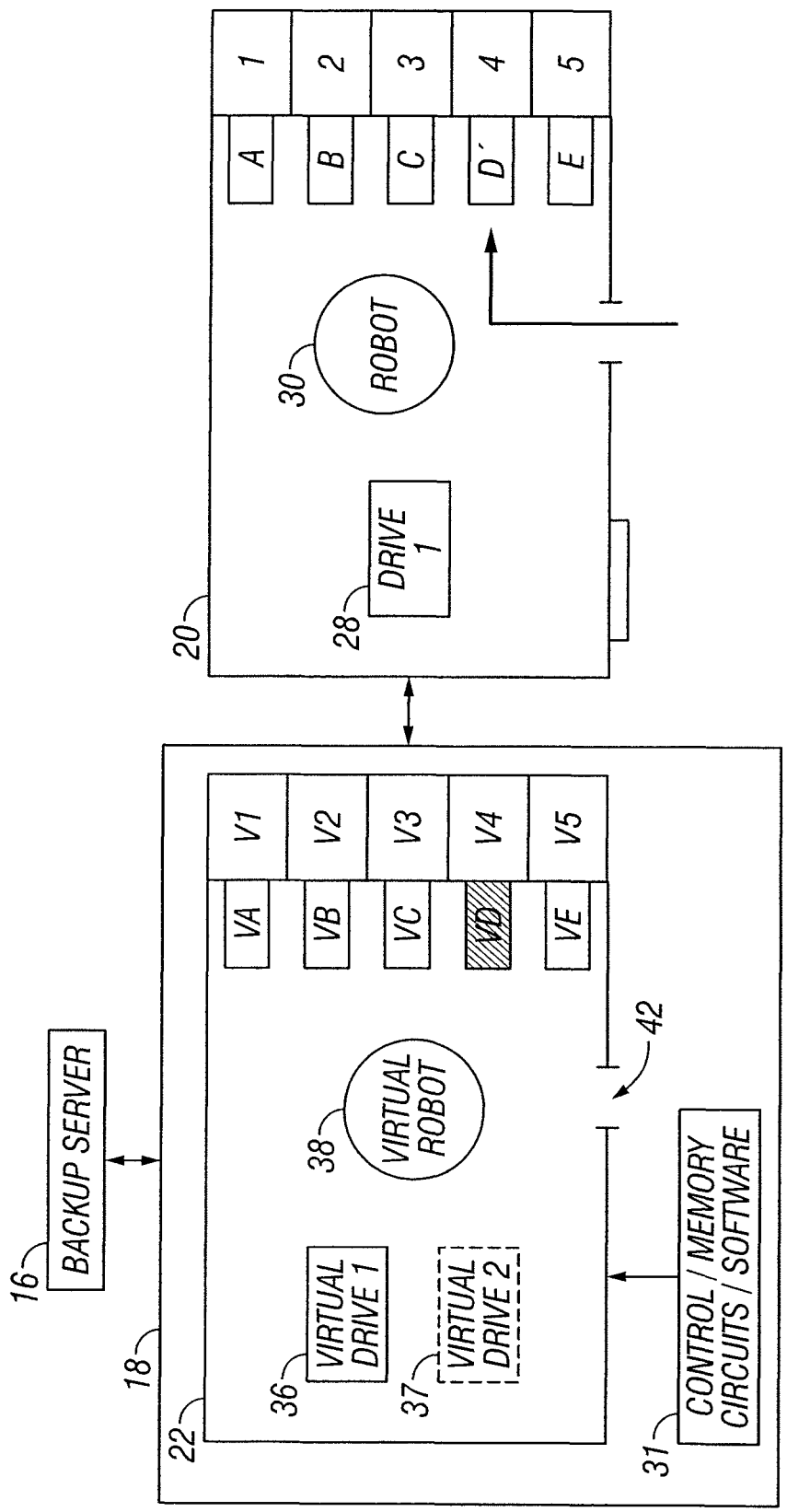
Figure 9C:
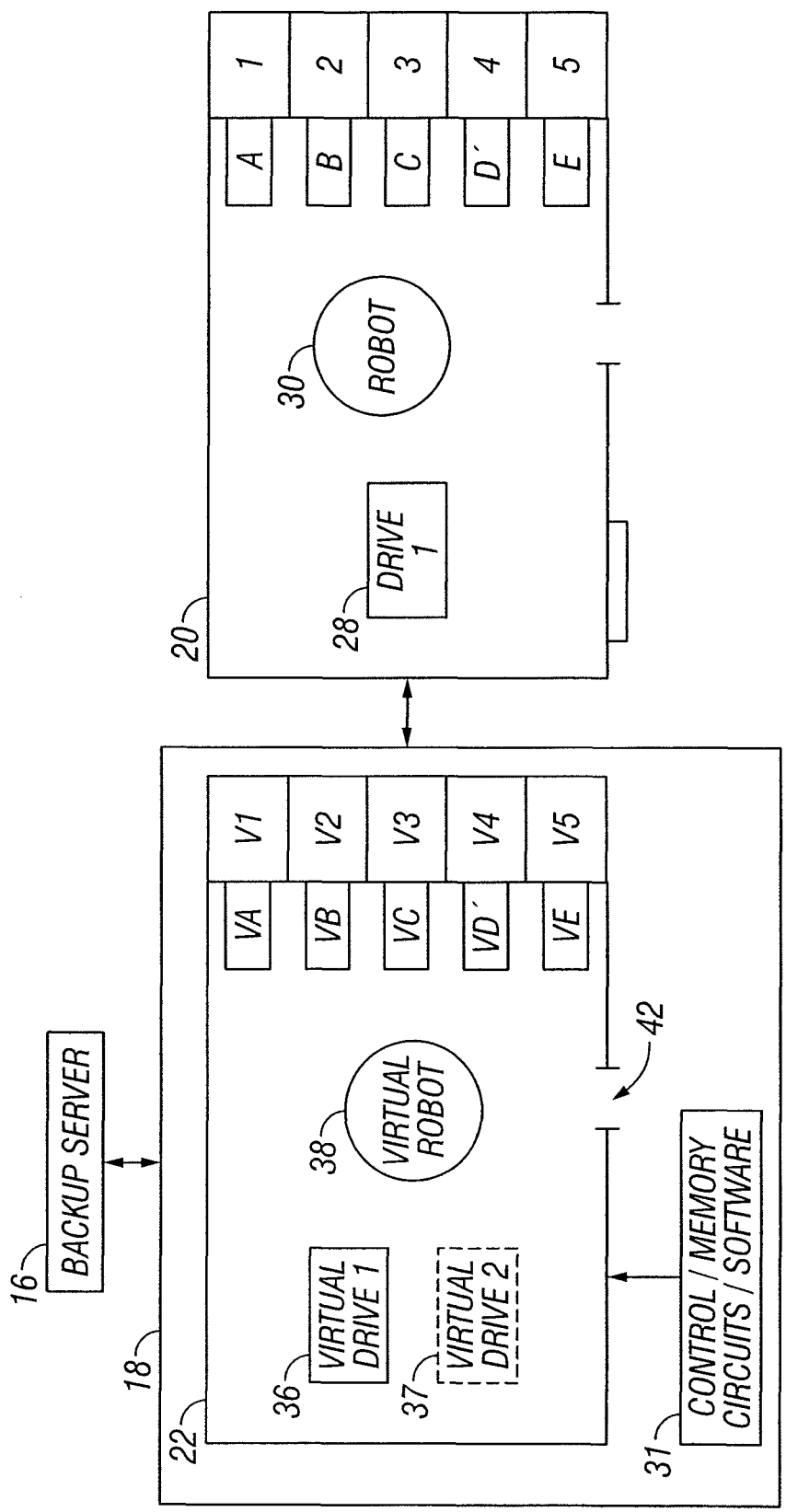

While a virtual tape is write-protected, the virtual slot that it is stored in (virtual slot V4 in this example) is not available for importation of a new virtual tape. If a new physical tape D' (e.g., a replacement tape for the exported physical tape) is imported to the PTL 20 in the physical slot 4, then it will be detected at step 185, also illustrated in FIG. 9B. A check is made at decision block 190 as to whether or not the write protection of the virtual tape VD located in the virtual slot V4 where the new physical tape was inserted has expired. If the write protection time has been reached, then the write protection is canceled at step 195 and a new virtual tape VD' is emulated (step 200) in the virtual slot V4 where the expired write protected virtual tape D was located as shown in FIG. 9C. If the write protection has not expired, then the disk appliance masks the imported tape at step 205. During backups, the backup software will utilize space on the non-write protected tapes until the write protection for the tape cartridge VD expires and the cartridge VD is exported from the VTL 22.

Figure 10:
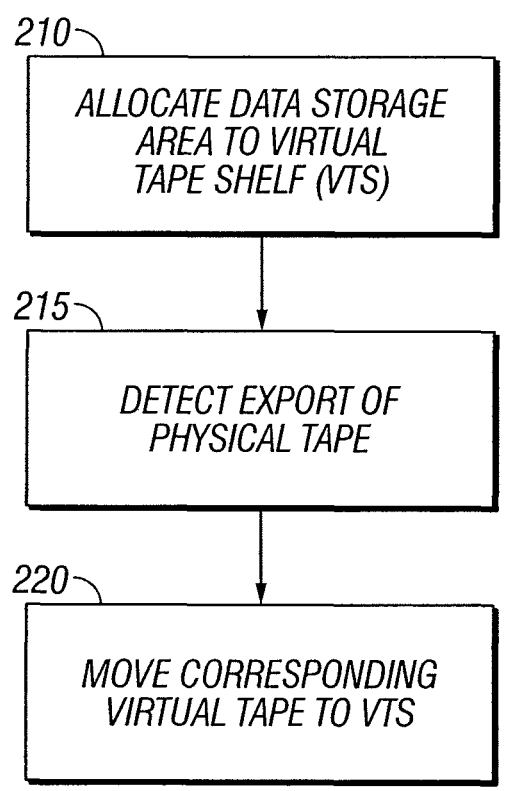
FIG. 10 is a flow chart of the operation of a virtual shelf in the system of FIG. 2.
Figure 11A:
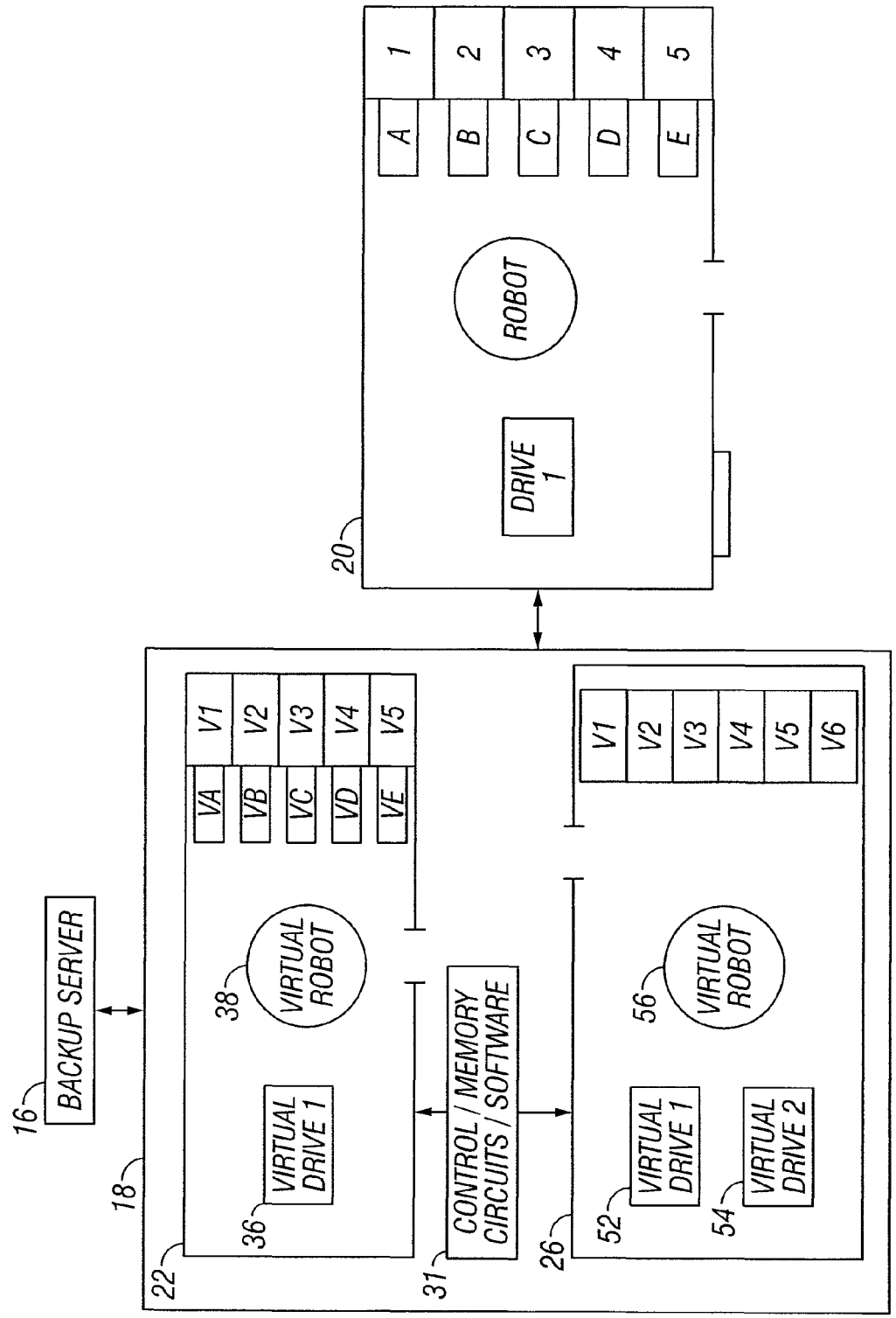
FIGS. 11A and 11B are functional block diagrams of virtual and physical library configurations in another embodiment of the invention.
Figure 11B:
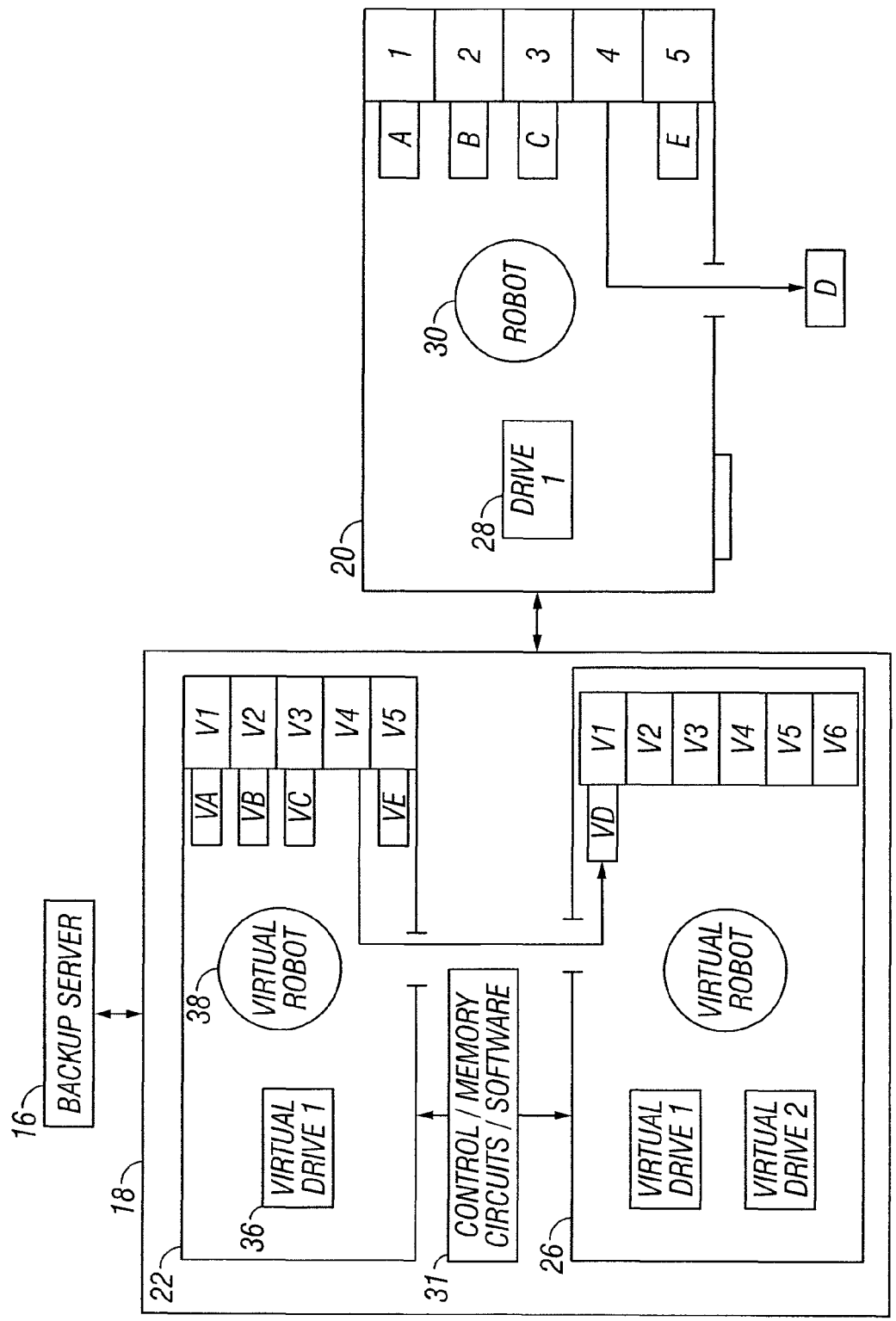

FIG. 10 shows a flow diagram illustrating certain steps in an exemplary process of utilizing the virtual tape shelf (VTS) 26 as discussed above and shown in FIG. 2. The exporting of physical tape D from PTL 20 will be used as an example embodiment of a way to use the VTS 26 and the process of FIG. 10. Configurations of PTL 20, VTL 22, and VTS 26 are illustrated in FIGS. 11A and 11B. Starting at step 210, a data storage area is allocated to the VTS 26. Step 210 may be performed as part of the configuration management step 105 shown in FIG. 4A. The VTS 26 may include one or more virtual tape drives 52, 54, as well as a virtual robotic cartridge exchanger 56. Also included are multiple virtual tape storage slots, designated V1 through V6 in FIGS. 11A and 11B. At step 215, a command to the PTL 20 corresponding to removal or export of physical tape D is detected. At step 220, in response to the detected removal of physical tape D, the virtual tape VD disappears from VTL 22 and appears in a storage slot of VTS 26. The virtual tape D is still available to the disk appliance 18 when it is in the VTS 26.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A storage system comprising:
    a tape drive including an exportable slot for receiving a physical tape;
    a hard disk drive, wherein the hard disk drive comprises a first portion associated with a virtual slot; and
    a disk based storage appliance configured to:
    emulate a first physical tape received at the exportable slot of the tape drive in the first portion of the hard disk drive associated with the virtual slot as a first emulated tape corresponding to the first physical tape;
    detect a request to export the first physical tape from the tape drive; and
    maintain the first emulated tape corresponding to the first physical tape after the first physical tape is exported from the tape drive.

2. The storage system of claim 1, wherein emulating the first physical tape comprises querying the first physical tape to acquire a configuration of the first physical tape received by the tape drive.

3. The storage system of claim 1, wherein maintaining the emulated first physical tape comprises write protecting the emulated first physical tape.

4. The storage system of claim 1, further comprising a command receiver configured to receive tape commands from backup software, and wherein the storage system is configured to provide data from the emulated first physical tape after the first physical tape is exported from the tape drive.

5. The storage system of claim 1, wherein maintaining the emulated first physical tape comprises assigning a data retention time limit for the emulated first physical tape, wherein the emulated first physical tape is maintained and write-protected for a period of time equal to the data retention time limit.

6. The storage system of claim 5, wherein the disk based storage appliance is further configured to:
   detect insertion of a second physical tape into the tape drive; and
   emulate the second physical tape using the first portion of the hard disk drive if the period of time exceeds the data retention time limit.

7. A storage appliance comprising:
   a first data connection for communicating with a physical tape drive device including an exportable slot for receiving a physical tape;
   a second data connection for communicating with a hard disk drive, the hard disk drive comprising a first portion of memory associated with a virtual slot; and
   a tape emulator configured to:
   transmit, to the hard disk drive, data emulating a first physical tape received at the exportable slot of the physical tape drive device in the first portion of memory of the hard disk drive associated with the virtual slot as a first emulated tape corresponding to the first physical tape;
   detect a request to export the first physical tape communicated to the physical tape drive device; and
   maintain the first emulated tape corresponding to the first physical tape after the first physical tape is exported from the tape drive.

8. The storage appliance of claim 7, wherein the tape emulator is configured to query the first physical tape to acquire a configuration of the first physical tape received by the tape drive device, where the data emulating the first physical tape transmitted to the hard disk includes the acquired configuration.

9. The storage appliance of claim 7, wherein maintaining the emulated first physical tape comprises write protecting the emulated first physical tape on the hard disk drive.

10. The storage appliance of claim 7, further comprising a command receiver configured to receive tape commands from a backup server, and wherein the storage appliance is configured to provide data from the emulated first physical tape after the first physical tape is exported from the tape drive device.

11. The storage appliance of claim 7, wherein maintaining the emulated first physical tape comprises assigning a data retention time limit for the emulated first physical tape, wherein the emulated first physical tape is maintained and write protected for a period of time equal to the data retention time limit.

12. The storage appliance of claim 11, wherein the tape emulator is further configured to:
   detect insertion of a second physical tape into the tape drive device; and
   emulate the second physical tape using the first portion of the hard disk drive if the period of time exceeds the data retention time limit.

* * * * *